J. J. HENNESSY.
JOURNAL BEARING FOR CAR AXLES.
APPLICATION FILED OCT. 6, 1919.
1,403,163.
Patented Jan. 10, 1922.
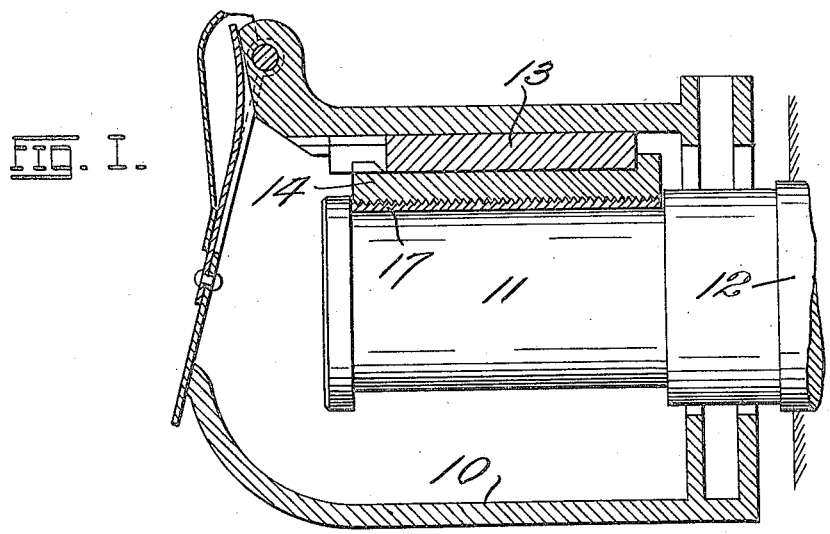
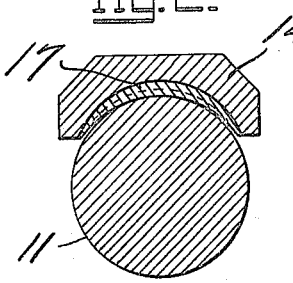
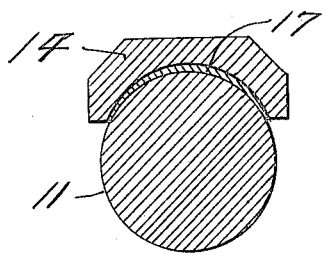
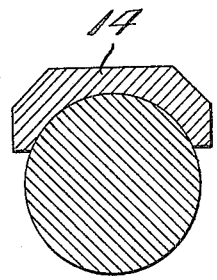
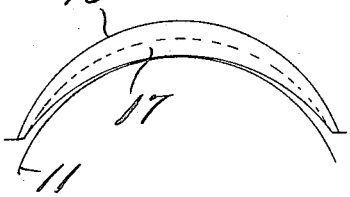
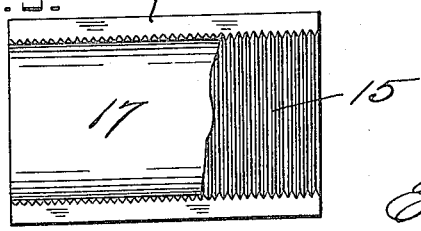
INVENTOR.
J. J. Hennessy.
BY
ATTORNEY.

UNITED STATES PATENT OFFICE.

JAMES J. HENNESSY, OF NEW YORK, N. Y.

JOURNAL BEARING FOR CAR AXLES.

1,403,163.  Specification of Letters Patent.  Patented Jan. 10, 1922.

Application filed October 6, 1919. Serial No. 328,758.

*To all whom it may concern:*

Be it known that I, JAMES J. HENNESSY, a citizen of the United States, residing at New York city, New York, have invented a certain new and useful Improvement in Journal Bearings for Car Axles, of which the following is a full, clear, and exact description, such as well enable others skilled in the art to which it appertains to make and use the same, reference being had the accompanying drawings, forming part of this specification.

My invention relates generally to journal bearings, and more particularly to a bearing that is utilized in connection with the journals of railway car axles.

The principal objects of my invention are, to provide a relatively simple, inexpensive and efficient bearing comprising a main body portion of relatively hard metal and a lining of relatively soft metal, such as babbitt, thus reducing to a minimum the tendency of the bearing to heat as a result of friction between said bearing and the journal; to provide a bearing, the construction of which is such that but a relatively small amount of soft lining metal is required, thereby materially decreasing the cost of production; to provide improved means for anchoring the lining metal to the body of the bearing, and, further, to provide a bearing which, by virtue of its peculiar construction, is wear-resisting to a maximum degree, thereby materially increasing the life or period of service of the bearing over the types of bearings now in general use and consequently decreasing the cost of replacement of bearings that have become worn to such a degree as to be unfit for service.

With the foregoing and other objects in view, my invention consists in certain novel features of construction and arrangement of parts, hereinafter more fully described and claimed, and illustrated in the accompanying drawings, in which—

Figure 1 is a vertical section taken lengthwise through the center of a railway car journal box and showing one of my improved bearings positioned therein.

Figure 2 is a cross sectional view of a bearing of my improved construction in position upon a journal.

Figure 3 is a sectional view similar to Figure 2, and showing the bearing as it appears after a considerable period of service.

Figure 4 is a sectional view similar to Figures 2 and 3, and showing the bearing as it appears after the relatively soft metal lining has been entirely worn away.

Figure 5 is a view looking against the underside of the journal bearing with a portion of the soft metal lining removed therefrom.

Figure 6 is a diagrammatic view showing the outlines of a portion of the bearing, the soft metal lining therefor, and a portion of the journal to which said bearing is applied.

Referring by numerals to the accompanying drawings, 10 designates a railway car journal box of conventional form and which receives the usual journal 11 on the end of an axle 12. Positioned against the top of the box 10 is the usual wedge or key 13 and arranged between the latter and the upper portion of journal 12 is the journal bearing.

The main body portion 14 of my improved journal bearing has practically the same shape as ordinary journal bearings and it is constructed of brass or similar relatively hard composition metal. The underside of this body 14 is made concave after the usual fashion and the surface of the concavity is provided with transversely disposed grooves 15 which are substantially V-shape in cross section and their depth gradually decreasing toward their ends.

Obviously such construction provides a series of transversely disposed V-shaped ribs, the height of which gradually decreases toward their ends. These grooves may vary in size to suit different requirements, although for the ordinary railway car journal bearing I prefer to make them equal to about eight threads per inch U. S. standard. The grooves may be cut with an ordinary thread cutting tool, in which event they will lie at a slight angle relative to the planes occupied by the ends of the brasses or they may be formed straight across the concave surface of the brass so as to lie parallel with the ends thereof.

In order to obtain the best results from the bearing, I prefer to form the bottoms 16 of the grooves 15 on the same radius with that of a new or slightly worn journal. (See Fig. 6.)

Seated in the concavity in the underside of the body 14 of the brass and completely filling the grooves therein is a layer 17 of relatively soft composition metal such as babbitt, the same gradually tapering in thickness toward its side edges. The thickness of this layer of babbitt at the crown of the bearing or along the medial line thereof should be such that it extends beyond and overlies the apices of the ribs approximately one-sixteenth to one-eighth of an inch, and from this point the layer of babbitt gradually decreases in thickness toward its side edges so that along the latter there is very little, if any, babbitt overlying the apices of the end portions of the ribs. (See Fig. 6.)

By virtue of this construction, the radius of the undersurface of the layer of babbitt 17 is substantially greater than that of the journal 11. Consequently, when the bearing is first applied for use, the parts contact with each other only at one point, namely, a line along the crown or medial line of a bearing.

Inasmuch as the layer of babbitt overlies the ribs between the grooves 15, the journal for a certain portion of its life or period of service will contact only with said babbitt and gradually the latter will be worn away until the surface of the journal makes contact with the apices of the ribs between the transverse grooves. As wear continues, the ribs will be gradually worn away and during this period of service, the surface of the bearing will be in contact with both brass and babbitt. During the final life or period of service of the bearing, the journal will gradually wear away the ribs and the babbitt in the grooves between the same until finally when the bottoms of the grooves have been reached, the journal will be making contact only with the brass body of the bearing.

Where bearings of my improved construction are utilized, the journal will in service wear through the bearing surface from one hundred per cent soft metal to one hundred per cent hard metal and such wearing action will take place without the development of an injurious degree of heat. The usual bearings for M. C. B. journals will not "run cool" after the babbitt or soft metal has worn away to such a degree as to permit the journal to make direct contact with the brass or hard metal back. This is due to the fact that after wear'ng through the soft metal the journal immediately makes contact with one hundred per cent hard metal and the radius of the bearing surface in the hard metal is not always the same as that of the journal, and as a result, the entire bearing pressure occurs along a relatively narrow strip of hard metal at the crown of the brass.

A journal bearing of my improved construction is very simple, can be easily and cheaply manufactured, and is very effective in performing its intended functions.

It will be readily understood that minor changes in the size, form and construction of the various parts of my improved journal bearing can be made and substituted for those herein shown and described, without departing from the spirit of my invention, the scope of which is set forth in the appended claims.

I claim:

1. A journal bearing comprising a body formed of relatively hard metal, the concave underside of which is provided with transversely disposed V-shaped grooves, and a layer of relatively soft metal applied to said grooved concave underface the radius of the undersurface of said layer of soft metal being substantially greater than that of the journal that is applied to said bearing.

2. A journal bearing comprising a body formed of relatively hard metal, the concave underside of which is provided with transversely disposed V-shaped grooves, and a layer of relatively soft metal applied to said grooved concave underface, the thickness of which layer of soft metal gradually decreases toward its side edges and the radius of the undersurface of said layer of soft metal being substantially greater than that of the journal that is applied to said bearing.

3. A journal bearing comprising a hard metal body, the concave underface of which is provided with transversely disposed V-shaped ribs which gradually decrease in height toward their ends, and a layer of relatively soft metal applied to the concave underface of said body and overlying the ribs thereon the radius of the undersurface of said layer of soft metal being substantially greater than that of the journal that is applied to said bearing.

4. A journal bearing comprising a hard metal body, the concave underface of which is provided with transversely disposed V-shaped ribs which gradually decrease in height toward their ends, and a layer of relatively soft metal applied to the concave underface of said body and overlying the ribs thereon, the thickness of which layer of soft metal gradually decreases toward its side edges the radius of the undersurface of said layer of soft metal being substantially greater than that of the journal that is applied to said bearing.

5. A journal bearing comprising a body formed of relatively hard metal, the concave underside of which is adapted to fit a journal to be applied to said bearing, grooves in said concave unders'de, and a layer of relatively soft metal filling said grooves and extending centrally beyond the edges thereof between the ends of said grooves and being substantially flush with the edges of said grooves adjacent to the ends of the latter.

In testimony whereof I hereunto affix my signature this 2nd day of October, 1919.

JAS. J. HENNESSY.